United States Patent [19]

McMahon et al.

[11] Patent Number: 4,782,492
[45] Date of Patent: Nov. 1, 1988

[54] THERMALLY CONTROLLABLE OPTICAL DEVICES AND SYSTEM

[75] Inventors: Donald H. McMahon, Carlisle; William A. Dyes, Groveland, both of Mass.

[73] Assignee: Polaroid Corporation, Cambridge, Mass.

[21] Appl. No.: 859,487

[22] Filed: May 5, 1986

[51] Int. Cl.⁴ .................. H01S 3/04; F27D 23/024; G02F 1/01; G02B 6/02
[52] U.S. Cl. ........................... 372/34; 372/32; 372/87; 350/353; 350/393; 350/96.29
[58] Field of Search ............ 350/353, 354, 393, 96.29, 350/351; 372/32, 34, 87

[56] References Cited

U.S. PATENT DOCUMENTS

| | | | |
|---|---|---|---|
| 2,710,274 | 6/1955 | Kuehl | 350/353 |
| 3,558,891 | 1/1971 | Kaiser | 350/96.29 |
| 3,584,934 | 6/1971 | French | 350/354 |
| 3,617,108 | 11/1971 | Fritsch et al. | 350/96.29 |
| 3,987,373 | 10/1976 | Mohler | 372/34 |
| 4,013,466 | 3/1977 | Klaiber | 350/351 |
| 4,119,842 | 10/1978 | Hayden et al. | 250/201 |
| 4,387,462 | 6/1983 | Markus | 372/34 |
| 4,417,782 | 11/1983 | Clarke et al. | 350/96.29 |
| 4,577,100 | 3/1986 | Meltz et al. | 350/96.29 |
| 4,615,587 | 10/1986 | Krasutsky et al. | 350/353 |

FOREIGN PATENT DOCUMENTS 52-70852  6/1977  Japan .................. 350/96.29

OTHER PUBLICATIONS

Taylor, "A Liquid-Vapor Display", Proceedings of the IEEE, vol. 61, No. 2, Feb. 1973, pp. 148-152.

Primary Examiner—Eugene R. LaRoche
Assistant Examiner—Michael Shingleton
Attorney, Agent, or Firm—Francis J. Caufield

[57] ABSTRACT

A system for the thermal control of optical devices includes an optical device having at least one coating of an electrically conductive material formed on a surface in a heat conducting relationship with the material and connected to a controllable current source which passes varying amounts of electrical current through the layer to vary the amount of thermal energy introduced into the device to control its optical response characteristics. The electrically conductive layer or layers can be optically active, that is, function to affect the light energy transmitted into or through the device as well as acting as an electrically conductive thermal element. The use of an electrically conductive coating or coatings allows the rapid and precise control of thermal energy introduced into the device and, accordingly, the rapid and precise control of the optical characteristics of the device as well as providing a thermal interface between the optical device and the ambient environment that is effective to minimize the adverse affects of transient temperature changes occurring in the environment.

11 Claims, 3 Drawing Sheets

THERMALLY CONTROLLABLE OPTICAL DEVICES AND SYSTEM

BACKGROUND OF THE INVENTION

The present invention relates to methods and apparatus for controlling the operating characteristics of optical devices. More particularly, it concerns the thermal control and thermal stabilization of optical elements and devices used in optical systems.

It is known that the operating and environmental temperature affect various functional characteristics of an optical device including the index of refraction of the particular optical material from which the device is made and the physical dimensions of the device. In an optical resonator, for example, where the resonant frequency is dependent on the physical length of an optical path, a change in resonator temperature will increase or decrease the optical path length and thus alter the frequency of the resonator. Unpredictable changes in temperature are undesirable and will usually diminish device or system performance. On the other hand, temperature can be used effectively to control an optical device or system to provide a desired functional result.

An effective use of temperature variation is that of tuning an optical resonator to a specific resonator frequency. A Fabry Perot etalon, for example, providing a resonant structure defined by spaced parallel reflective surfaces with an intermediate transmissive medium, can be tuned by controlling the operating temperature of the etalon. A change in temperature increases or decreases the index of refraction of the transmission etalon medium as well as the optical path length of the device between the reflectors. Thus, the resonant response of the etalon can be varied to support one of a plurality of possible resonant modes by a thermal tuning adjustment.

An optical device can be controlled or tuned in the aforementioned manner by placement in a thermally controlled chamber, such as an oven, and controlling the interior temperature of the oven to effect the desired control. While precise control of the chamber temperature is possible, the time required to attain a differential in temperature is longer than desirable for the responsiveness of the optical device in many applications. In addition, the physical constraints of an oven-like chamber or similar enclosure can limit the utility of the optical device or system.

In addition to ovens, discrete electrical heater elements or heater assemblies have been used for controlling optical devices. Discrete heater elements have included electrically heated metal plates which are placed in contact with the optical device and heater assemblies have included electrical conductors embedded in flexible or semi-flexible plastics or similar materials which are wrapped about or adhesively secured to the optical device. Discrete heaters, by their nature, involve the need to control the temperature of relatively large masses that are spaced a predetermined distance from the optical path so that rapid response to temperature fluctuations is not possible. With discrete heaters, uniform and rapid changes in the characteristics of the optical device are dependent upon the value and uniformity of the surface to surface thermal conductance. Since it can be difficult to achieve a uniform thermal conductance, discrete heaters can cause undesirable non-uniform heating.

As can be appreciated from a consideration of the above, a need exists for the efficient and reliable thermal control of optical devices in such a way that their optical characteristics can be rapidly controlled in a repeatable and predictable manner.

SUMMARY OF THE INVENTION

In view of the above, the present invention provides for the thermal control of optical elements in which the control is repeatable, precise, and relatively rapid compared to prior control arrangements. The optical elements are provided with a coating of a conductive material that is in intimate thermal contact with a surface or surfaces of the optical device. A controllable electric current is passed through the coating to develop thermal energy that is conducted, with a minimal time delay, into the optical material to effect the desired change in the optical characteristics of the device. The conductive coating can also function as an optically active surface, that is, as a reflector or light transmissive coating. In accordance with one aspect of the present invention, the conductive coating or coatings are preferably positioned to function as a thermal boundary, that is, a thermally active interface between the optical device and the ambient environment which acts as a thermal buffer to minimize the adverse affects of thermal transients occurring in the ambient environment.

In the preferred embodiment of the present invention, a Fabry Perot etalon is formed with electrically conductive partially transmitting and partially reflecting coatings on each end face so that light of a selected wavelength will be transmitted through the etalon. The electrically conductive end face reflectors are connected in circuit with a source of electrical energy to pass current through the electrically conductive reflectors to develop thermal energy which is rapidly and uniformly conducted into the optically transmissive material of the etalon. The operating temperature of the device is accordingly changed to effect a corresponding change in the optical response characteristics of the etalon.

In another embodiment, a substrate, which supports a resonant loop structure, is formed with an electrically conductive coating which is connected to a source of electrical energy. Electrical current passed through the coating develops thermal energy which is quickly conducted to the resonant loop to alter its resonant characteristics as a function of temperature.

The use of a controlled electrical current flowing through a coating in uniform and intimate contact with the optical path of an optical device, including coatings that are optically active in the operation of the device, allows for the relatively rapid introduction of controllable amounts of thermal energy into the optical path within the device to provide rapid and precise control of the optical characteristics of the device.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
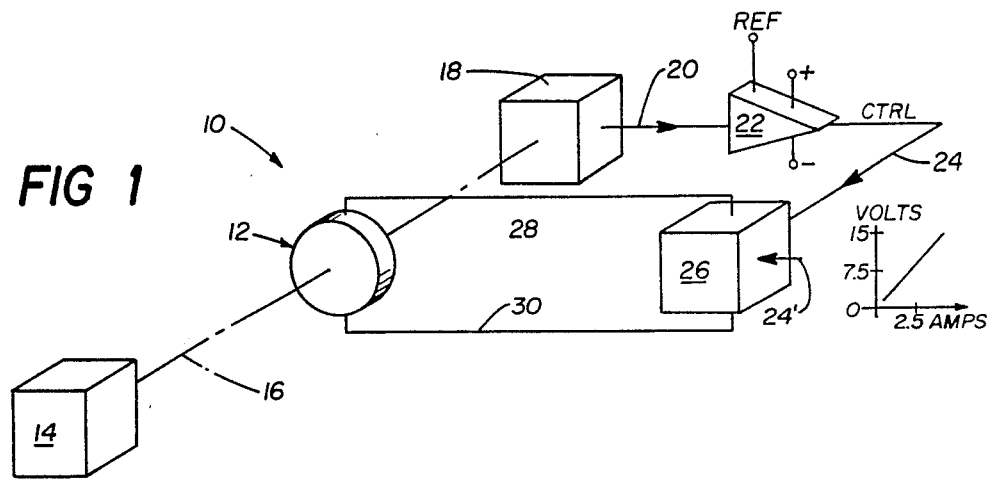
FIG. 1 is an isometric projection, in schematic block form, of an optical device control system in accordance with the present invention.

A system for controlling optical devices in accordance with the present invention is illustrated in schematic block form in FIG. 1 and designated generally therein by the reference character 10. As shown, the system 10 includes a thermally controllable optical device 12, in the form of a Fabry Perot etalon as described more fully below, a preferably monochromatic light source 14 for projecting light along an axis 16 into and through the optical device 12, and a photosensor 18 aligned along the axis 16 to sense one or more characteristics of the light energy passed through the optical device 12. The photosensor 18 provides an electrical output along a circuit path 20 to an amplifier 22 which, in turn, provides its output along a circuit path 24 to a controllable current driver 26. The thermally controllable optical device 12 is connected to the controllable current source 26 through circuit paths 28 and 30 so that electrical current presented from the controllable current driver 26 through the circuit paths 28 and 30 causes an increase or decrease in thermal energy presented to the optical device 12 to change one or more of the device characteristics.

Figure 3:
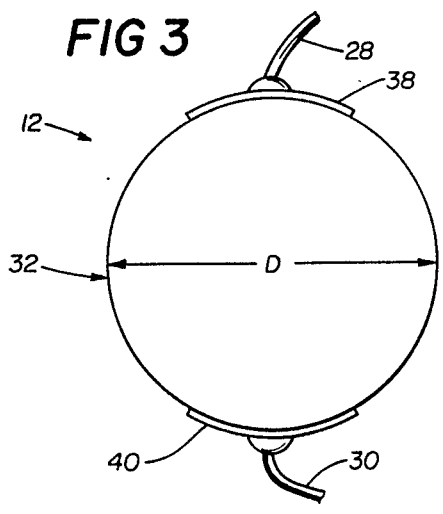
FIG. 3 is a front elevational view of an illustrative optical device in accordance with the present invention.
Figure 4:
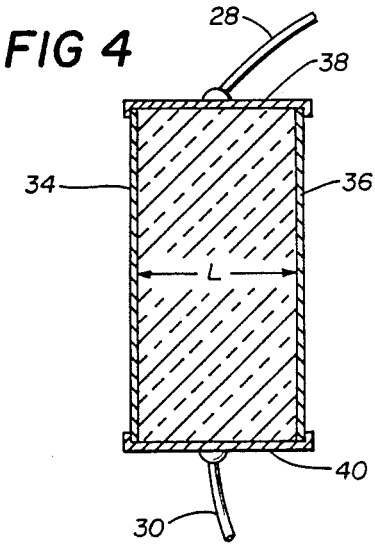
FIG. 4 is a side elevational view, in cross section, of the optical device illustrated in FIG. 3.

The illustrated optical device 12 is in the form of a Fabry Perot resonant cavity or etalon and is illustrated in front elevational view in FIG. 3 and in side elevational cross section in FIG. 4. The optical device 12 is formed generally as a cylindrical body 32 from an optical material having a diameter dimension "D" and a length dimension "L". In the case of the preferred embodiment, the body 32 is formed from an optical glass having an index of refraction of approximately 1.5, a diameter dimension "D" of approximately 18 mm, and a length dimension "L" of approximately 12 mm. The end faces (unnumbered) are flat and sufficiently parallel with one another to perform the desired function. A coating 34 is applied to one end face and is fabricated from an electrically conductive material designed to have partially light transmitting and partially light reflecting properties. A similar coating 36 is formed on the other end face. In the preferred embodiment, the coatings 34 and 36 are formed from gold that is deposited, for example, by vapor deposition, sputtering, electrochemical deposition, or a functionally equivalent process, onto the two end faces and formed with a coating thickness that provides the desired transmissive/reflective characteristics. In the case of the illustrated embodiment, a 500 Angstrom thick electrically conductive gold coating provides 1.5% transmission efficiency at 800 nm. As can be appreciated, different coating thicknesses, generally between 50 and 1000 Angstroms, provide correspondingly lower or higher transmission values. Additionally, other materials, such as metals or metal oxides including silver, copper, aluminum, indium oxide, indium-tin oxide, or the like, can be used separately or in combination to form the coatings 34 and 36 to provide the desired transmission or reflective characteristics. The use of indium tin oxide, for example, can provide preferred low resistivity (e.g., 10 ohms/square) electrically conductive coatings 34 and 36 with transmission efficiencies of 80–90% and can be placed over low optical loss multi-layer dielectric coatings to provide high reflectivity and low optical loss.

The coatings 34 and 36, because of their electrical conductivity and in accordance with the present invention, function as thin film heater elements and also cooperate with the body 32 to define a resonant cavity structure. As shown in FIGS. 3 and 4, conductive bridge contacts 38 and 40 are formed on diametrically opposite portions of the peripheral surfaces of the body 32. The bridge contacts 38 and 40 can be formed from a conductive epoxy, for example, and can each subtend a peripheral area, such as 70 degrees, which is sufficient to effect good electrical contact with edge portions of each coating 34 and 36 to thus place the coatings 34 and 36 in parallel circuit. The conductive paths 28 and 30, described above, are connected, respectively, to the conductive bridges 38 and 40 using suitable connection techniques. In the preferred embodiment, each of the coatings 34 and 36 has an ohmic resistance, when measured across diametrically opposed points, of approximately 10 ohms. Accordingly, when the coatings 34 and 36 are placed in parallel circuit, as described above, the composite resistance is approximately 5 ohms. If desired and as explained below in relation to FIG. 9, the conductive coatings 34 and 36 can be placed in series circuit with the controllable current driver 26.

The photo detector 18 is designed to be amplitude responsive, that is, to provide an output that indicates when the amplitude of the light along the axis 16 introduced into the photo detector 18 at a selected frequency corresponds to a desired amplitude and also provides an indication as to when the amplitude of the light entering the photo detector 18 is above or below the desired frequency value. If desired, a narrow bandwidth optical filter or filters (not shown) can be provided as part of the photo detector 18 arrangement to achieve the desired frequency responsive characteristics.

The amplifier 22 may take the form of a differential amplifier connected between positive and negative power sources to provide a settable output relative to a reference input REF when the output of the photo detector 18 indicates that the output of the light passed through the optical device 12 to the photo detector 18 is at a desired amplitude, a lesser value when the amplitude of the light energy is less than that desired, and a greater value when the amplitude of the light is higher than the desired value. For example and as illustrated by the graph in FIG. 1, the amplifier 22 can provide a control CTRL output between zero and +15 volts with a 7.5 volt output representing the desired equilibrium or set point at which the amplitude of the light is one-half the maximum value, this set point representing a stable reference through-put value that occurs at half the amplitude of the maximum spectral transmission at resonance. The current driver 26 responds to the output of the amplifier 22 to decrease or increase the current passed through the conductive coatings 34 and 36 to decrease or increase the thermal energy developed and the temperature of the optical device 12 to change the optical properties in such a way to thermally control the functional characteristics of the optical device 12.

The optical device 12 operates as a conventional Fabry Perot etalon with light energy directed along the axis 16 entering the optical device 12 through an entry coating, for example, the coating 34, passing through the optical material of the optical body 32, and exiting the optical device 12 through an exit coating, namely, the coating 36. Since the coatings 34 and 36 are partially reflecting, a portion of the light energy incident upon the exit coating 36 will be reflected internally back toward the entry coating 34 to define forward and reverse direction wave patterns in the optical body between the coatings 34 and 36. At selected frequencies, that is, frequencies corresponding to one of the plurality of resonant modes supported within the cavity, the forward and reverse direction light wave patterns will constructively interfere to increase the amplitude of the light in the cavity and that of the light passed to the photo detector 18 while decreasing the amount of light reflected back toward the source 14.

The system 10 of FIG. 1 operates to control the thermal characteristics of the optical device 12 by varying the current passed through the parallel connected coatings 34 and 36 to frequency lock one of the device's resonant modes to the wavelength of the light source 14 to thus function as an optical filter for passing light at the frequency of the desired spectral line and attenuating light at higher and lower frequencies. More specifically, the current driver 26 is designed to pass current through the parallel connected coatings 34 and 36 between minimum and maximum values, for example and as indicated by the graph in FIG. 1, between zero and five amps with an intermediate level current, for example, 2.5 amps, passed through the coatings 34 and 36 when the system is operating at the desired equalibrium point described above. The intermediate current level is selected to provide enough thermal energy to raise the temperature of the optical device 12 to an equilibrium temperature that is above the local ambient so that the temperature of the device can be lowered by lowering the thermal energy introduced into the device or increased by increasing the thermal energy introduced into the optical device by appropriate control of the current driver 26. Where the photo detector 18 indicates that the amplitude of the light energy exiting the optical device 12 at the desired frequency is less than the set point, the amplifier 22 provides a control signal CTRL to the controllable current driver 26 to increase the current and the thermal energy provided to the optical device 12 to thus lower the operating temperature. As a result of the lower operating temperature, the index of refraction of the optical material is changed and the effective path length is likewise changed, that is, shortened, so that the frequency of the selected resonant mode continues to be passed to the photo detector 18. Conversely, where the photo detector 18 indicates that the amplitude of the light energy exiting the optical device 12 is greater than a desired level, the amplifier 22 provides a control signal CTRL to the controllable current driver 26 to decrease the current and the thermal energy provided to the optical device 12 to thus decrease its operating temperature to again tune the frequency of a resonant mode to provide a desired photodetector 18 output. As can be appreciated, the system of FIG. 1 thus controls the operating characteristics of the optical device 12 in such a way to maintain the desired optical transmission function. The control elements, namely, the photodetector 18, the amplifier 22, and the controllable current source 26 are preferably configured to provide a critically damped or overdamped system to minimize overshoot. Such control may be achieved, for example, by combining an integrator function with the amplifier 22.

The system 10 of FIG. 1 has been shown as a closed loop feedback system responsive to an optical characteristic of the light passed through the optical device 12. If desired, open loop control can be provided by interrupting the circuit path 24 and providing an input 24' to the current driver 26 for effecting direct thermal control of the optical device 12.

The use of conductive coatings 34 and 36 has a number of functional advantages. Since the conductive coatings 34 and 36 are in uniform and intimate physical contact with the material which defines the optical body 32, thermal energy is directly conducted into the optical path portion of the optical material with a minimal time delay to cause uniform heating and to allow accurate and repeatable thermal control of the optical device 12. Since the conductive coatings 34 and 36 are positioned to define a boundary or interface between the optical material and the ambient environment, changes in the local environment, such as undesired air currents, have minimal effects since they are instantaneously buffered through the thermally active coatings 34 and 36.

Figure 2:
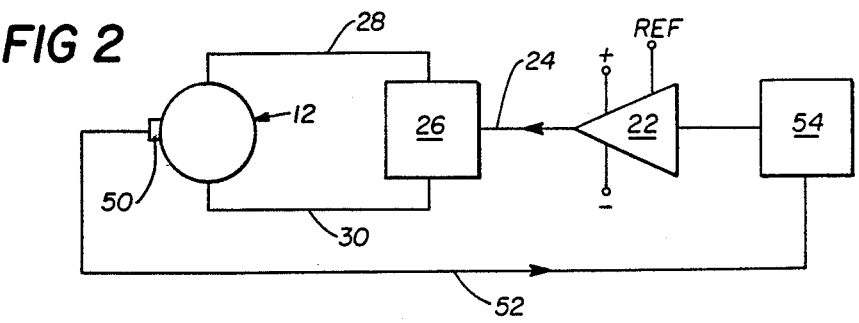
FIG. 2 is a schematic block diagram of an alternate embodiment of an optical device control system in accordance with the present invention.

In the embodiment of FIG. 1, a characteristic of the light energy passed through the conductive coatings 34 and 36 is used to effect control. Other arrangements, such as that illustrated in FIG. 2, in which like parts are designed by like reference characters, are also suitable. In FIG. 2, a thermally responsive device 50, such as a thermocouple or thermistor, is placed in thermal contact with the optical device 12 so as to sense the operating temperature of the device. The output of the thermally responsive device 50, be it a voltage in response to the operation of a thermocouple or a resistance value in response to the operation of a thermister, is provided along circuit path 52 to an evaluation circuit 54, such as a conventional Wheatstone bridge arrangement, with the output of the evaluation circuit 54 indicative of the operating temperature of the optical device 12 relative to a reference value. The output of the evaluation circuit 54 is provided to an amplifier 22 for controlling the controllable current driver 26 in the manner described above.

Figure 5:
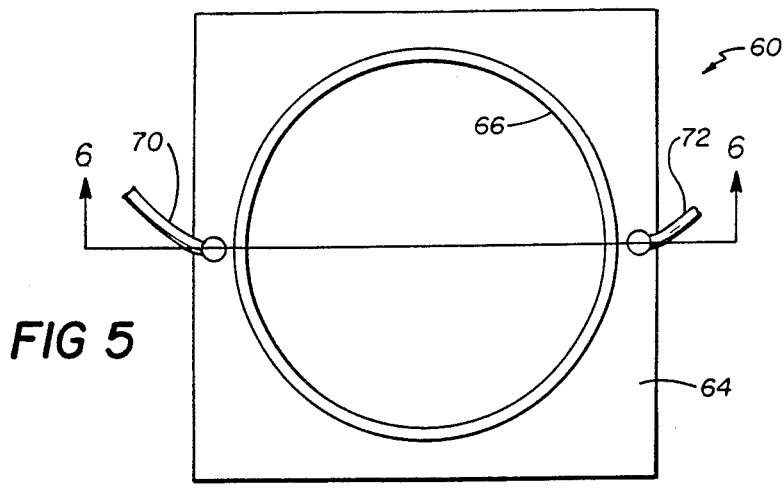
FIG. 5 is a plan view of another optical device in accordance with the present invention.
Figure 6:
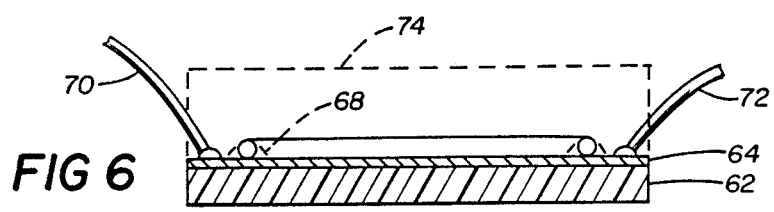
FIG. 6 is a side view, in cross section, of the optical device of FIG. 5, taken along line 6—6 of FIG. 5.

In the embodiment of FIG. 1, the electrically conductive coatings 34 and 36 are also optically active, that is, they affect a characteristic of the optical energy presented through the optical device 12. In the embodiments of FIGS. 5-8, a conductive coating is provided which is not optically active. However, in common with FIG. 1, the thermal energy is generated immediately adjacent the optical path and is generated in such a way to separate or define a boundary between the thermally controlled optical path and the non-temperature controlled environment. In FIGS. 5 and 6, an optical device 60 includes an electrically nonconductive substrate 62, such as a ceramic, glass, plastic, or similar material, upon which an electrically conductive coating 64 is deposited as described above. An optical structure, such as the continuous optical fiber resonant loop 66, is mounted upon the coating 64 and maintained in place, for example, by a thermally conductive cement 68 or similar adhesive material (shown in dotted line illustration in FIG. 6). Electrical connection is effected through leads 70 and 72 secured to the conductive coating 64 through suitably formed contact points (unnumbered) with the leads 70 and 72 connected to a controllable current driver as described above. Optionally, thermal insulating material 74 (shown in dotted line outline in FIG. 6) can be mounted over the resonant loop 66 and the conductive coating 64. Thus, any thermal transfer between the fiber ring and the non-temperature controlled environment can only take place through the controlled conductive fiber heater. The optical device 60 of FIGS. 5 and 6 can be controlled in the manner described above for the embodiments of FIGS. 1 and 2, that is, an optical characteristic or the device temperature can be sensed and the electrical current passed through the conductive coating 64 controlled in response to either the sensed optical characteristic or the device temperature.

Figure 7:
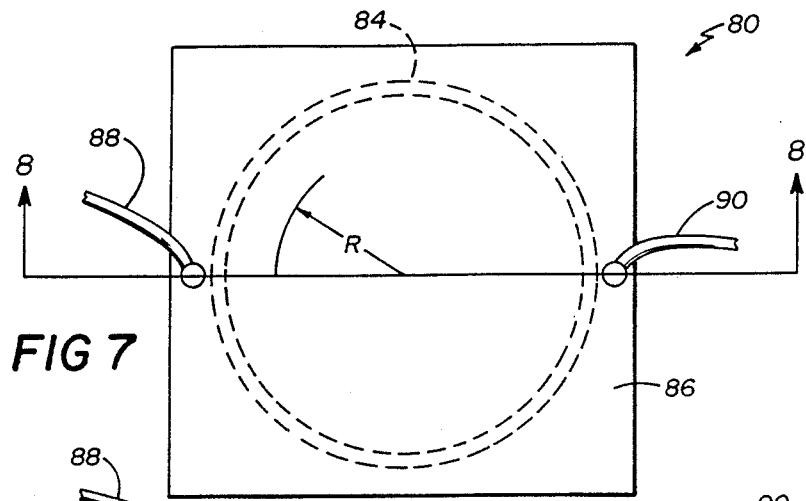
FIG. 7 is a plan view of a further embodiment of an optical device in accordance with the present invention.
Figure 8:
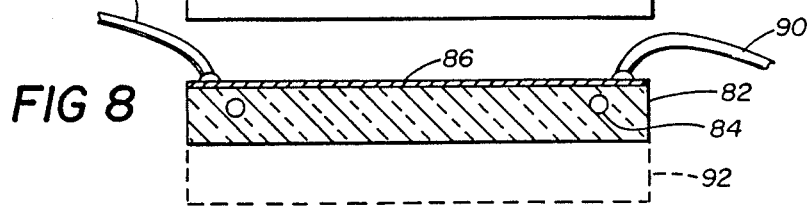
FIG. 8 is a side view, in cross section, of the optical device of FIG. 7, taken along line 8—8 of FIG. 7.

An integrated version of the optical device 60 of FIGS. 5 and 6 is illustrated in FIGS. 7 and 8 and designated therein by the reference character 80. As shown, the optical device 80 includes a substrate 82 formed from an optical material, such as soda-lime glass or functionally equivalent materials, with a continuous light guiding loop 84 formed within the substrate 82. The light guiding loop 84 may be formed by doping selected zones or areas within the substrate 82 with an index of refraction increasing dopant or dopants as is known in the art. An electrically conductive coating 86 is formed on one side of the substrate 82 adjacent the light guiding loop and is connected through circuit leads 88 and 90 through appropriate contacts (unnumbered). The coating 86 can be formed across the entire surface of the substrate 82 or, if preferred, a opening (not specifically shown), such as a circular opening as represented in schematic form in FIG. 7 by the radius line R, can be provided. Thermal insulation 92 (shown in dotted line outline in FIG. 8) may be provided in the manner described above. The optical device 80 of FIGS. 7 and 8 can be controlled in the manner described above for the embodiments of FIGS. 1, 2, and 5 and 6, that is, an optical characteristic or the device temperature can be sensed and the electrical current passed through the conductive coating 86 varied in a manner responsive to the sensed optical characteristic or temperature to effect device control.

Figure 9:
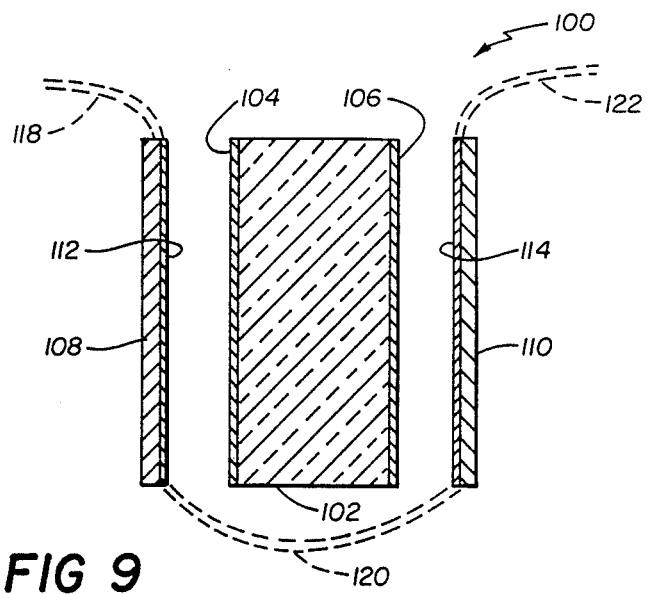
FIG. 9 is a side view, in cross section, of a variation of the optical device illustrated in FIG. 3.
Figure 10:
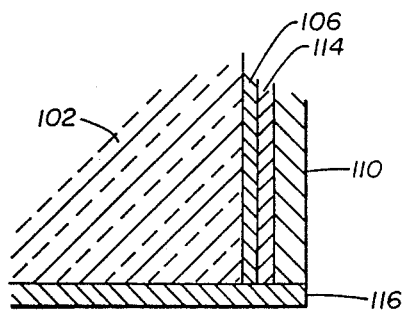
FIG. 10 is a partial detail view, in cross section, of the device of FIG. 9.

In some applications, it may be desirable or necessary to use optically active coatings that are electrically insulating in order to achieve the desired optical effect. For example and as shown in FIGS. 9 and 10, an optical device 100 can include an optical body 102 having partially transmitting and partially reflecting coatings 104 and 106 that are also electrically nonconductive. Materials which are electrically nonconducting and which exhibit certain desirable optical functions include various types of dielectrics such as silicon dioxide and silicon monoxide. If desired, the coatings 104 and 106 can be fabricated from a plurality of sublayers. The optical device 100 includes separate relatively thin end plates 108 and 110, preferably having a low thermal capacity, to which electrically conductive coatings 112 and 114 are applied as described above. Where the optical function is critical, the electrically conductive coatings 112 and 114 can be fabricated from a material that is relatively transparent to the light transmitted into or through the optical device 100, such materials including indium oxide, indium tin oxide, and related alloys. Additionally, openings or "windows" (not shown) can be provided in the electrically conductive coatings 112 and 114 through which light energy is passed. The end plates 108 and 110 are cemented to the body 102 with the coatings 112 and 114 in engagement, respectively, with the electrically nonconductive coatings 104 and 106 or, in the alternative, with the uncoated faces of the end plates 108 and 110 cemented to the electrically nonconductive coatings 104 and 106. Bridge contacts, as represented by the bridge contact 116 shown in FIG. 10, can be applied to a peripheral surface portion of the optical device 100, in the manner described above, to place the electrically conductive coatings 112 and 114 in parallel circuit. If desired, and as illustrated in schematic fashion in FIG. 9 by the dotted line circuit paths 118, 120, and 122, the electrically conductive coatings 112 and 114 can be placed in series circuit. The operation of the optical device 100 illustrated in FIGS. 9 and 10 and as described above, is similar to that described above for the optical devices of FIGS. 1 and 2 in that varying amounts of electrical current can be passed through the electrically conductive coatings 112 and 114 to introduce varying levels of thermal energy into the optical device 100 to control device temperature. The electrically conductive coatings 112 and 114, however, are optically transparent to the light controlled by the device 100 and accordingly are optically inactive.

As can be appreciated from a consideration of the above, optical devices and systems fabricated in accordance with the present invention allow precise and rapid control of the optical devices without the need for the control of environmental temperatures, for example, through the use of ovens or other enclosed chambers. Additionally, the use of electrically conductive coatings in uniform and intimate contact with the material of the optical device allows uniform and relatively rapid changes in the operating temperature with minimal time delays and also function as a thermal barrier or buffer between the optical device and the ambient environment to minimize the adverse affect of transient thermal conditions, such as undesired convection currents, on the optical device.

Thus, it will be appreciated from the above that as a result of the present invention, highly effective thermally controllable optical devices and systems are provided by which the principal objective, above others, is completely fulfilled. It will be equally apparent and as contemplated that modifications and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A thermally controllable optical device comprising:
    a body of light transmitting material forming at least part of an optical cavity structure having a resonant characteristics which vary with temperature, said body being formed with first and second substantially parallel faces;

means defining a surface in heat conducting relationship with said body;

a coating of an electrically conductive material formed on said first face so as to have light transmitting and reflecting characteristics;

another coating of an electrically conductive material formed on said second face so as to have light transmitting and reflecting characteristics; and circuit means for connecting said one coating and said other coating in electrical circuit with one another for passing an electrical current therethrough to develop thermal energy sufficient to vary the resonant characteristics of said optical cavity structure.

2. A thermally controllable optical device comprising:

a body of light transmitting material having a light affecting property which varies with temperature;

means defining a surface in heat conducting relationship with said body;

at least one coating of an electrically conductive material formed on said surface defining means;

means for effecting an electrical circuit with said one layer for passing an electrical current therethrough to develop thermal energy sufficient to vary the light affecting property of said light transmitting material, wherein said body is formed with first and second substantially parallel faces and said one electrically conductive coating is formed on one face so as to have light transmitting and reflecting characteristics; and said optical device further comprising another coating of an electrically conductive material formed on the other of said first and second faces so as to have light transmitting and reflecting characteristics;

said circuit means connecting said one coating and said other coating in electrical circuit with one another for passing an electrical current therethrough to develop thermal energy sufficient to vary the light affecting property of said light transmitting material;

wherein said body, said one coating, and said other coating define an optical cavity structure having resonant characteristics, and said electrically developed thermal energy is sufficient to vary the resonant characteristics of said optical cavity structure.

3. The thermally controllable optical device of claim 1, wherein said circuit means connects said one coating and said other coating in parallel circuit.

4. The thermally controllable optical device of claim 1, wherein said circuit means connects said one coating and said other coating in series circuit.

5. A thermally controllable optical device comprising:

a body of light transmitting material forming at least part of an optical cavity structure having resonant characteristics which vary with temperature, said body being formed with first and second faces which are substantially parallel with one another;

means defining a surface in heat conducting relationship with said body;

at least one coating of an electrically conductive material formed on said surface defining means;

a first light transmitting member having said one electrically conductive coating thereon so as to have light transmitting and light reflecting characteristics, said one light transmitting member in surface engagement with said first face of said body;

a second light transmitting member having another coating of an electrically conductive material thereon so as to have light transmitting and reflecting characteristics, said second light transmitting member in surface engagement with said second face of said body; and circuit means for connecting said one coating and said other coating in electrical circuit with one another to pass an electrical current therethrough to develop thermal energy sufficient to vary the resonant characteristics of said optical cavity structure.

6. A thermally controllable optical device comprising:

a body of light transmitting material having a light affecting property which varies with temperature;

means defining a surface in heat conducting relationship with said body;

at least one coating of an electrically conductive material formed on said surface defining means; and means for effecting an electrical circuit with said one layer for passing an electrical current therethrough to develop thermal energy sufficient to vary the light affecting property of said light transmitting material, wherein said body is formed with first and second faces which are substantially parallel with one another; said optical device further comprising:

a first light transmitting member having said one electrically conductive coating thereon so as to have light transmitting and light reflecting characteristics, said one light transmitting member in surface engagement with said first face of said body; and a second light transmitting member having another coating of an electrically conductive material thereon so as to have light transmitting and reflecting characteristics, said second light transmitting member in surface engagement with said second face of said body;

said circuit means connecting said one coating and said other coating in electrical circuit with one another to pass an electrical current therethrough to develop thermal energy sufficient to vary the light affecting property of said material;

wherein said body, said one coating, and said other coating define an optical cavity structure having resonant characteristics, and the electrically developed thermal energy is sufficient to vary the resonant characteristics of said optical cavity structure.

7. The thermally controllable optical device of claim 5, further comprising: at least one coating of an electrically nonconductive material formed on at least one of said first and said second faces of said body, said electrically nonconductive material having light affecting properties.

8. The thermally controllable optical device of claim 5, wherein said one electrically conductive coating is in surface engagement with said one face of said body.

9. The thermally controllable optical device of claim 5, wherein said other electrically conductive coating is in surface engagement with said second face of said body.

10. The thermally controllable optical device of claim 5, wherein said circuit means connects said one conductive coating and said other conductive coating in parallel circuit.

11. The thermally controllable optical device of claim 5, wherein said circuit means connects said one conductive coating and said other conductive coating in series circuit.

* * * * *